W. W. GERBER.
REVOLVING EXPLOSION ENGINE.
APPLICATION FILED SEPT. 24, 1913.
1,188,924.
Patented June 27, 1916.
4 SHEETS—SHEET 1.
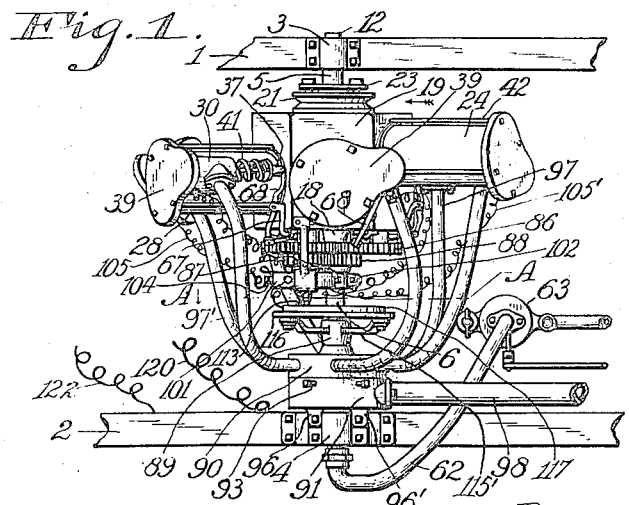
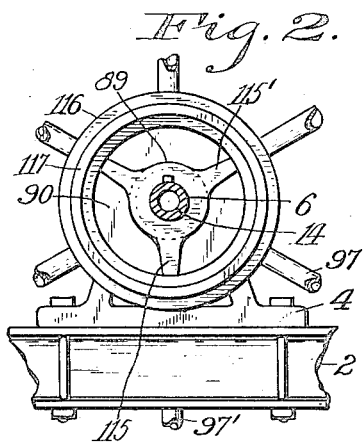
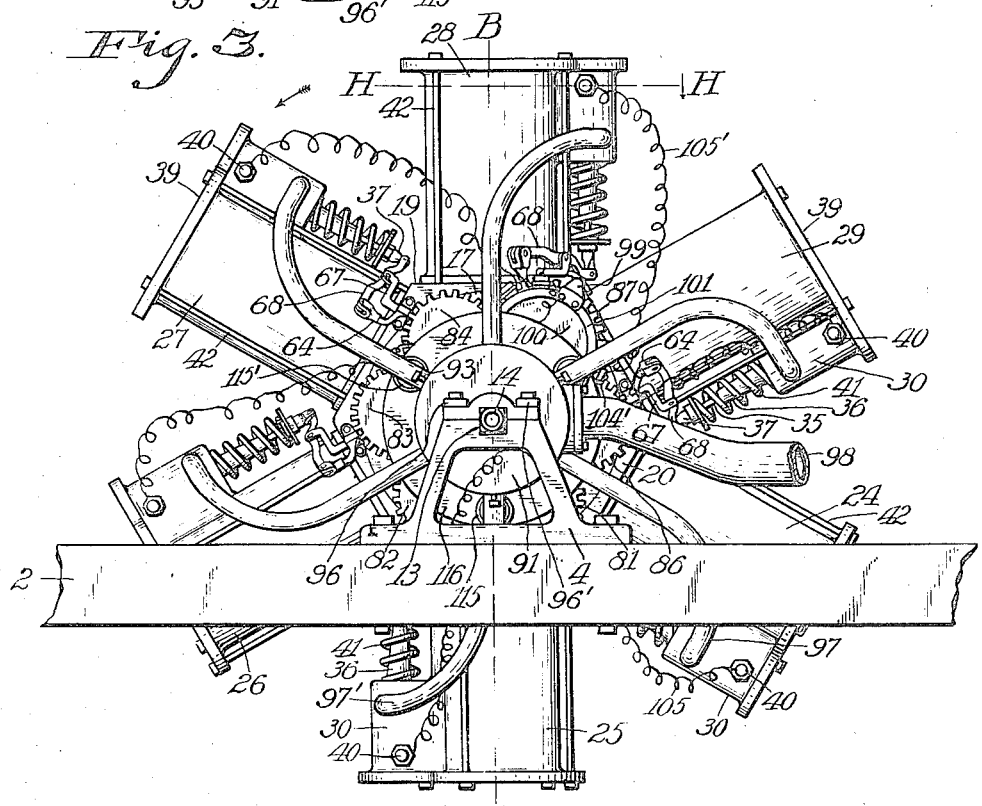
WITNESSES:
J. H. Gardner
M. E. Sparrow
INVENTOR:
William W. Gerber,
BY
E. T. Silvius,
ATTORNEY.

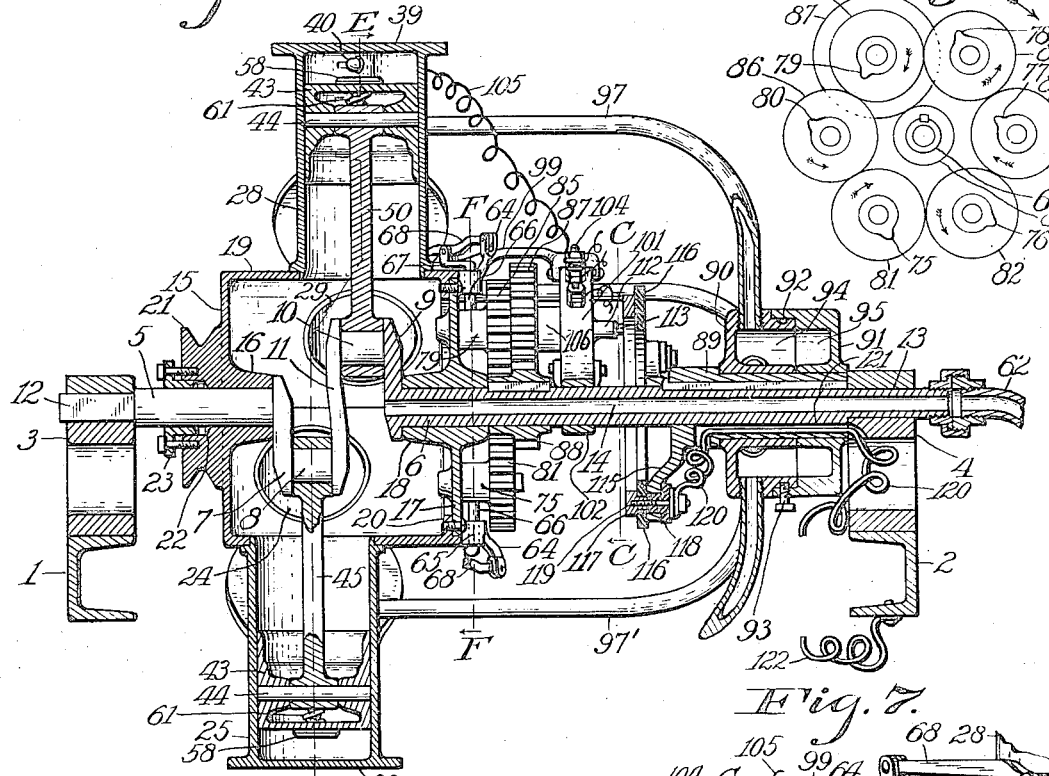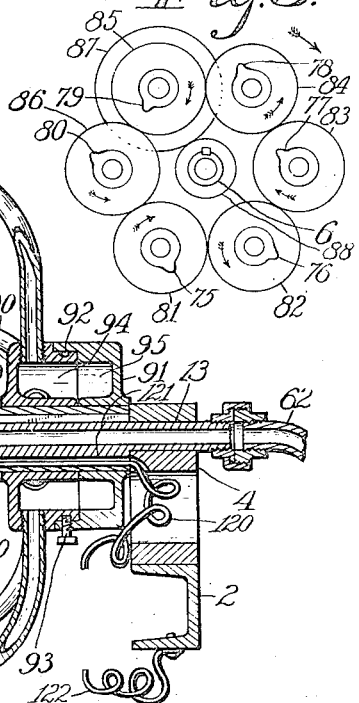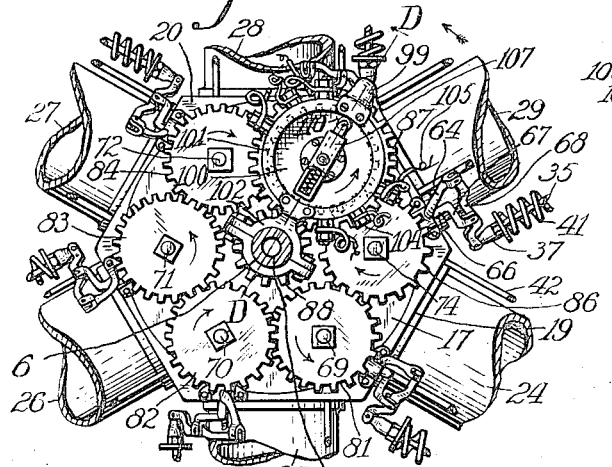

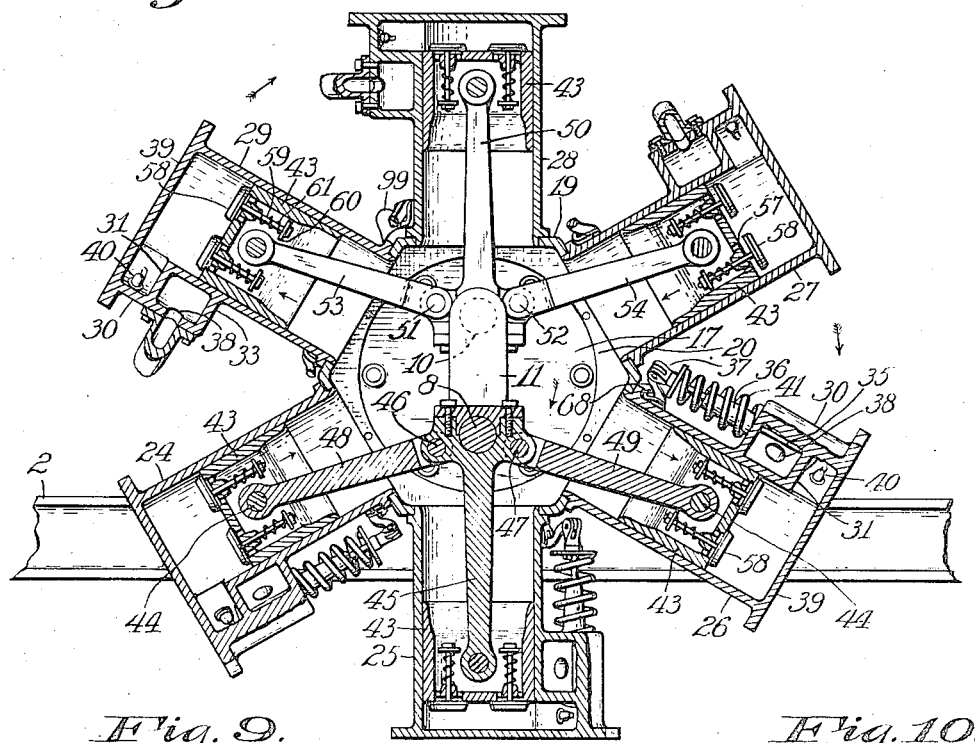

W. W. GERBER.
REVOLVING EXPLOSION ENGINE.
APPLICATION FILED SEPT. 24, 1913.
1,188,924.
Patented June 27, 1916.
4 SHEETS—SHEET 4.
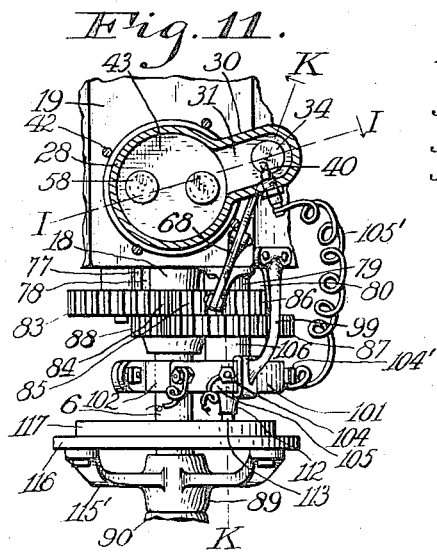
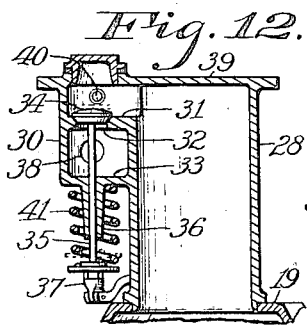
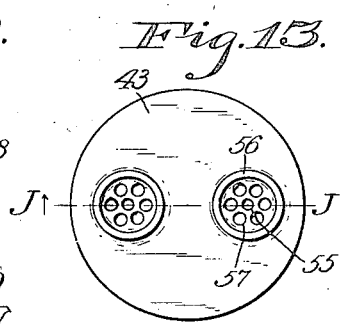
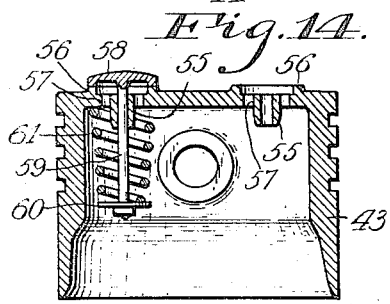
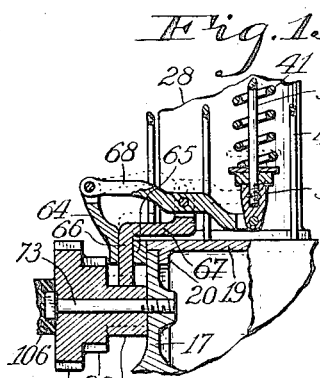
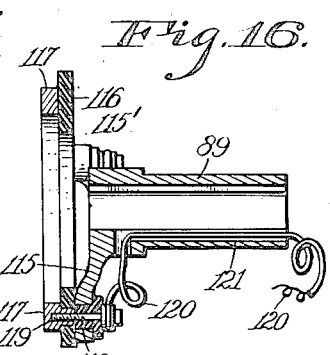
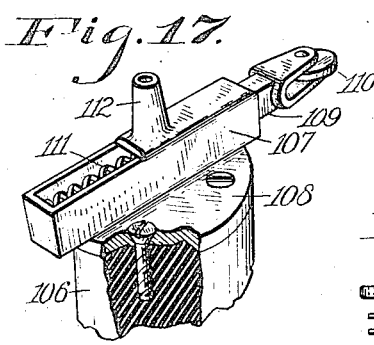
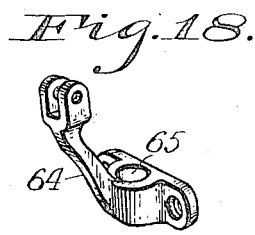
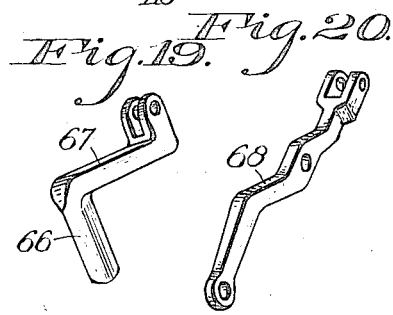
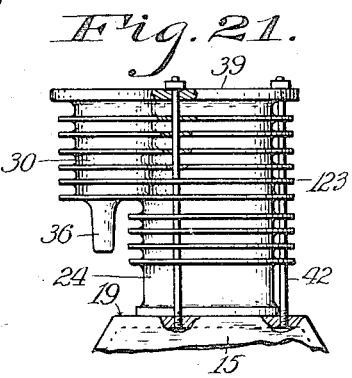
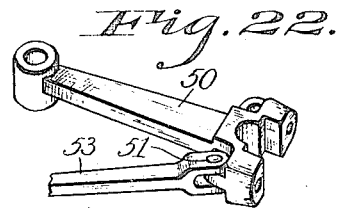
WITNESSES:
J. H. Gardner
M. E. Sparrow
INVENTOR:
William W. Gerber,
BY E. T. Silvius,
ATTORNEY.

UNITED STATES PATENT OFFICE.

WILLIAM W. GERBER, OF INDIANAPOLIS, INDIANA, ASSIGNOR OF ONE-HALF TO WALTER P. GERBER, OF DES MOINES, IOWA.

REVOLVING EXPLOSION-ENGINE.

1,188,924.    Specification of Letters Patent.    Patented June 27, 1916.

Application filed September 24, 1913. Serial No. 791,524.

*To all whom it may concern:*

Be it known that I, WILLIAM W. GERBER, a citizen of the United States, residing at Indianapolis, in the county of Marion and State of Indiana, have invented a new and useful Revolving Explosion-Engine, of which the following is a specification, reference being had to the accompanying drawings, and to the letters and figures of reference marked thereon.

This invention relates to the type of engine that comprises one or more cylinders and reciprocatory pistons therein that revolve about a stationary shaft for controlling the operation of the engine mechanism, the invention having reference more particularly to the construction generally of the engine and especially with respect to the valve operating gearing and also apparatus for controlling ignition of explosive charges.

An object of the invention is to provide a powerful and relatively compact engine, especially of the explosion engine type which shall be of such construction as to be adapted to be manufactured cheaply in large numbers and require relatively few patterns for casting, with large multiplication of power.

A further object of the invention is to provide an evenly balanced explosion engine, especially of high power capacity and which shall be especially adapted for use in automobile construction and also for propelling boats as well as for factories or shops.

A still further object of the invention is to provide an explosion engine which shall be so constructed as to permit the power cylinders to be grouped in relatively small compass for acting on a crank shaft whereby to transmit power.

With the above mentioned and other objects in view, the invention consists in an improved explosion engine comprising cylinders and pistons therein, novel means for controlling the admission of explosive charges to the cylinders, novel means for controlling escape of the exhaust gases from the cylinders, and novel means for producing and controlling the ignition of the explosive charges.

The invention consists further in the novel parts and in the combinations and arrangements of parts as hereinafter particularly described and further defined in the accompanying claims.

Referring to the drawings, Figure 1 is a fragmentary top plan of a horizontal frame such as that of an automobile and the improved engine mounted thereon; Fig. 2, a fragmentary elevation approximately on the lin A A in Fig. 1; Fig. 3, a side elevation of Fig. 1, but with the engine in a slightly different position; Fig. 4, a central section approximately on the line B B in Fig. 3; Fig. 5, a diagrammatic view of the train of gearing for operating the exhaust valves of the engine, the gear wheels being indicated only by pitch lines thereof; Fig. 6, a fragmentary sectional elevation approximately on the line C C in Fig. 4; Fig. 7, a fragmentary section on the line D D in Fig. 6; Fig. 8, a section approximately on the line E E in Fig. 4; Fig. 9, a fragmentary sectional elevation approximately on the line F F in Fig. 4; Fig. 10, a fragmentary section on the line G G in Fig. 7; Fig. 11 a fragmentary section on the line H H in Fig. 3; Fig. 12, a fragmentary section approximately on the plane of the line I I in Fig. 11; Fig. 13, a top plan of the improved piston adapted for admitting explosive charges into the explosion chambers; Fig. 14, a section on the plane of the line J J in Fig. 13; Fig. 15, a fragmentary section approximately on the line K K in Fig. 11; Fig. 16, a fragmentary section on the line B B in Fig. 3; Fig. 17, a perspective view of portions of the explosion timer; Figs. 18, 19, and 20, perspective views of different parts of the exhaust valve controller; Fig. 21, a side elevation of one of the cylinders provided with heat radiators, and Fig. 22, a perspective view of connected parts of the engine.

Similar reference characters in the different figures of the drawings indicate corresponding elements or features of construction herein referred to in detail.

As sufficing for a clear understanding of the invention, two members 1 and 2 of a suitable frame are illustrated, two suitable bearings 3 and 4 being secured thereon respectively and suitably support a main shaft which comprises a cylindrical journal portion 5 and an alining cylindrical journal portion 6, the portion 5 having a crank arm 7 thereon provided with a crank pin 8, the portion 6 having a crank arm 9 thereon provided with a crank pin 10, the two crank pins being on opposite sides of the axis of rotation of the shaft and are connected together by an arm 11.

In the preferred construction and arrangement of parts the main shaft is stationary, the portion 5 thereof having a squared portion 12 which is secured fixedly in the bearing 3, the alining portion 6 having a squared portion 13 which is fixedly secured in the bearing 4. The portion 6 of the shaft has a duct 14 extending longitudinally therethrough for the passage of explosive mixture into the crank box of the engine which comprises a head 15 having a hub 16 rotatably mounted on the shaft portion 5, a head 17 having a hub 18 rotatably mounted on the shaft portion 6, and a peripheral or rim portion 19 having an internal flange 20 to which the head 17 is detachably secured, so that the crank box is approximately drum shaped, and as a convenient form the peripheral portion 19 is hexagonal exteriorly. In order to transmit motion the head 15 or its hub is provided with a suitable wheel or pulley 21 which preferably has a packing box 22 therein provided with a packing gland 23 for preventing escape of explosive mixture.

A suitable number of cylinders are employed, preferably six cylinders, 24, 25, 26, 27, 28 and 29, respectively, all being alike and radially arranged on the peripheral portion of the crank box and suitably secured thereto, the axis of three of the cylinders being on a plane slightly removed from the plane of the axis of the remaining three cylinders. Each cylinder has a valve chest 30 thereon in which is a partition 31 having a port 32, the chest having a head 33 opposite the partition. The port is provided with an exhaust valve 34 having a stem 35 that extends through the head 33 and also through a guide 36 fixed to and extending from the head. The valve stem is provided with a pivot head 37 on its end for opening the valve which is adapted to admit the exhaust gases from the explosion chamber into the space between the partition 31 and the head 33 to pass out through an outlet opening 38 formed in the valve box. Each cylinder is provided with a head 39 on its outer end and it extends over the valve chest so as to form an explosion chamber communicating with the cylinder beyond the partition 31, the wall of the explosion chamber being provided with a jump spark plug 40. The exhaust valve is normally held in closed position preferably by means of a coil spring 41 extending about the guide 36 and seated on the head 33 and the pivot head 37. The cylinders are secured to the crank box preferably by means of a suitable number of rods or bolts 42. The cylinders are so positioned as to bring the valve chests on one plane between the planes of the axis of the two groups of cylinders. This arrangement of the cylinders and valve chests distributes the weight thereof equally on the two hubs 16 and 18.

Each cylinder has a piston 43 therein as in common practice, all the pistons being alike and having each a suitable wrist pin 44. A main pitman 45 is connected with the piston in the cylinder 25 and also with the crank pin 8 and is provided with two wrist pins 46 and 47 on opposite sides thereof, a companion pitman 48 being connected to the pin 46 and also with the wrist pin 44 of the piston in the cylinder 24, another companion pitman 49 being connected to the pin 47 and also with the piston in the cylinder 26. Another main pitman 50 is connected to the crank pin 10 and also with the piston in the cylinder 28 and is provided with wrist pins 51 and 52 on opposite sides thereof, a companion pitman 53 being connected with the pin 51 and also with the piston in the cylinder 29, a similar companion pitman 54 being connected to the pin 52 and also with the piston in the cylinder 27. When the cylinders collectively revolve about the main shaft, as will be readily understood, the pistons acquire a reciprocating movement in the cylinders, the same result being obtained if the cylinders are anchored or fixed while the shaft rotates. In order to admit the explosive mixture into the outer portion of the cylinders and into the explosion chambers, the head of each piston is provided with one or more guides 55 and a valve seat 56, a suitable number of apertures 57 being formed around the guide and are normally covered by a valve 58 seated on the valve seat 56, the valve having a stem 59 that extends through the guide and is provided with a head 60, a spring 61 being seated on the head and also on the inner side of the head of the piston and yieldingly holding the valve in closed position. When the piston moves toward the main shaft the valve opens if there is no pressure upon it and permits the passage of explosive mixture through the piston. The explosive mixture is conducted to the conduit 14 by means of a pipe 62 suitably connected to the shaft portion 6 adjacent to the bearing 4, the pipe being preferably connected with a carbureter 63.

In order to open the exhaust valves at the proper periods a number of arms 64 corresponding to the number of cylinders are secured to the crank box adjacent to the cylinders respectively, the base of each arm being provided with a guide 65 in which a push bar 66 is movably mounted and provided with an arm 67 to which a lever 68 is pivoted between its ends, one end of the lever being pivoted to the arm 64 and the opposite end to the head 37 on the stem of the valve for the adjacent cylinder, so that each exhaust valve is provided with independent controlling apparatus. There being six cylinders, a corresponding number of stub axles 69, 70, 71, 72, 73 and 74 are secured on the head 17 of the crank box so as to be on a circle concentric to the main shaft and opposite the ends of the push bars, and cams 75, 76, 77, 78, 79 and 80 are rotatably mounted on the stub axles respectively and are adapted to operate the respective push bars 66. The cams are operated by means of spur tooth gear wheels 81, 82, 83, 84, 85 and 86 that are fixedly connected to the cams respectively and consequently rotate on the stub axles, each two adjacent wheels being in mesh each with the other, so that all the wheels rotate in unison. One of the stub axles 73 is longer than the others and the gear wheel 85 thereon has a spur tooth gear wheel 37 fixed thereon which is in mesh with a pinion 88 that is secured fixedly on the main shaft portion 6, in the present case the pinion being one-half the diameter of the wheel 87.

In order that the exhaust gases may be conducted away from the cylinders under control, a sleeve 89 preferably is secured on the main shaft portion 6 adjacent to the bearing 4 and an exhaust box is suitably mounted thereon, the box preferably comprising two matched parts 90 and 91 that are suitably joined together so that the part 90 may rotate on the sleeve in contact with the part 91, one part having a peripheral groove 92, the companion part being provided with guide screws 93 that extend into the groove. The two parts together form a chamber comprising a receiving portion 94 in the part 90 and a discharge portion 95 in the part 91. The part 91 is provided with ears 96, 96′, that are secured to the bearing 4. A suitable number of exhaust pipes 97, 97′, are connected to the part 90 of the exhaust box and also to the respective valve chests 30 at the opening 38 therein, so that all the exhaust gases are conducted to the exhaust box. A single exhaust pipe 98 is fixedly connected to the part 91 of the exhaust box and may be extended to any point desired.

For the purpose of causing explosions in the cylinders at the proper periods during their revolution about the main shaft, an arm 99 is fixedly secured to the crank box adjacent to one of the cylinders and extends out beyond the gear wheel 87. An electrode holder comprising a disk 100 and a ring 101 thereon is secured to the arm and preferably provided with a steadying arm 102 that is rotatably supported on the shaft portion 6, the disk portion 100 serving to stiffen the ring of the holder which is composed of insulating material, the ring having a suitable number of electrodes 103, 103′ set into the inner face thereof so as to be flush with the face, and the electrodes are provided with binding screws 104, 104′ at the exterior of the ring. The electrodes may be variously spaced apart as may be required for timing the explosions according to the scheme that may be preferred. A suitable number of circuit wires 105, 105′ are provided and connected to the binding posts and also to the spark plugs 40 of the cylinders, respectively, so that each one of the spark plugs is in connection with a different one of the electrodes. An insulating block 106 is fixedly secured to the gear wheel 87. An electrical conducting guide head 107 is provided with a base 108 that is secured to the insulating block and carries an electrode 109 therein which preferably is provided with a contact roller 110 that rolls in contact with the inner side of the ring 101 and the electrodes 103, 103′, constant contact preferably being insured by means of a spring 111 mounted in the head 107 and yieldingly pressing the electrode outward toward the ring, the electrode being movable in the head and having sliding contact therewith so as to form an electrical circuit. The head 107 is provided with a socket 112 in which a brush 113 is movably guided and normally pushed outward by a spring 114 arranged behind it within the socket. The sleeve 89 is provided with arms 115, 115′, that support an insulating ring 116 to which an electrical conducting ring 117 is secured so as to be in contact with the brush 113, the ring 117 being supported concentrically to the main shaft, and the brush is carried about the shaft in sliding contact with the ring. An insulating bushing 118 is set into the arm 115 and extends to the ring 116, a binding screw 119 being secured to the ring 117 and extending through the bushing. A conducting wire 120 is connected to the binding screw and extends through a groove 121 that is formed in the sleeve 89, the wire obviously being provided with an insulating covering and may be connected with any suitable source of electric energy to be connected with a ground wire 122, the wire in the present case being connected to the frame member 2.

In the interest of clearness the obvious expedients for air-cooling the cylinders are purposely omitted in the several figures of the drawings, excepting in Fig. 21, the common form of radiating ribs 123 extending around the cylinder and the valve chest appear as sufficiently indicating the manner in which the cylinders may be prevented from becoming excessively hot in operation.

The wrist pins whereby each pitman other than a main pitman is practically connected with a crank pin may be variously positioned on the main pitman relatively to the crank pin, and will indicate the relative arrangement or spacing of the electrodes 103, 103′, 103″. For the purpose of illustration, the arrangement of the electrodes and the wires leading therefrom to the spark plugs bring about explosions in the different cylinders in the order referred to as follows: in cylinders 24, 28, 26, 27, 25 and 29.

Referring to Fig. 8, the positions of the different pistons in the respective cylinders indicate the following actions as taking place. Explosion has taken place in cylinder 24. In cylinder 25 scavenging is occurring. In cylinder 26 a charge is assumed to have been received and is being compressed preparatory to explosion. In cylinder 27 a charge is being received. In cylinder 28 it is assumed a charge has been compressed and is about to be ignited. In cylinder 29 exhaust is taking place.

The relative arrangement of various details being specifically described in order that the invention may be clearly understood, it is obvious that various modifications may be made and are contemplated within the scope of the accompanying claims.

In practical use, the main shaft being fixedly supported, the crank box containing the fuel and the cylinders revolve around the shaft, the crank box carrying the exhaust valve cams and their train of gearing around the main shaft, the cams and their gearing wheels rotating on their own axes. While the conducting ring 117 remains stationary, the timing apparatus and the wiring therefrom to the spark plugs are carried around the main shaft as are also the individual exhaust pipes for the several cylinders. While the electrode holder 101 and the electrodes thereon are carried about the main shaft as is also the brush 113 in contact with the ring 117 by means of the head 107, the head rotates on its axis at one-half the rate of speed of the main shaft. The various results of the explosions are well understood; and the results of operation of the various elements of the structure will be readily understood from the detailed description of the construction and function thereof, without requiring further explanation.

Various features of the engine structure which may not be claimed herein form the subject-matter of a divisional application for Letters Patent, filed April 6, 1914, Serial Number 829,835.

Having thus described the invention, what is claimed as new is—

1. An explosion engine including a crank shaft and a crank box on the shaft, one being rotatable relative to the other, cylinders secured to the box, pistons in the cylinders operatively connected with the shaft, spark plugs connected with the cylinders, an insulating ring provided with a support fixedly connecting the ring with the box, electrodes fixed in the ring, circuit wires connected with the electrodes and the plugs, an insulated head rotatably supported on the box and geared to the shaft, and an electrode carried by the head into contact with the electrodes successively.

2. An explosion engine including a crank shaft fixedly supported, a crank box rotatable on the shaft, cylinders secured to the box, pistons in the cylinders operatively connected with the shaft, spark plugs connected with the cylinders, an insulating ring provided with an arm that is fixedly secured to the box, the ring having also an arm that is journaled on the shaft, electrodes fixed in the ring, circuit wires connected with the electrodes and the plugs, an insulated head rotatably supported on the box and geared to the shaft, an electrode carried by the head in contact with the insulating ring and alternately with the electrodes therein, and a conductor having electrical connection with the head.

3. An explosion engine including a crank shaft fixedly supported, a crank box rotatable on the shaft, cylinders secured to the box, pistons in the cylinders operatively connected with the shaft, an insulating ring provided with an arm that is fixedly secured to the box, electrodes fixed in the ring, spark plugs connected with the cylinders, circuit wires connected with the electrodes and the plugs, a conducting ring fixedly supported concentrically to the shaft, an insulated head rotatably supported on the box and geared to the shaft, a brush carried by the head in contact with the conducting ring, and an electrode carried by the head in contact with the insulating ring and alternately with the electrodes therein.

4. An explosion engine including a crank shaft fixedly supported, a crank box rotatable on the shaft, cylinders secured to the box, pistons in the cylinders operatively connected with the shaft, spark plugs connected with the cylinders, an insulating ring on one side of the shaft and provided with an arm that is fixedly secured to the box, the ring having also an arm that is journaled on the shaft, electrodes fixed in the ring, circuit wires connected with the electrodes and the plugs, an insulated head rotatably supported on the box and geared to the shaft, a brush rotatably carried by the head in contact with the conducting ring, and an electrode carried by the head in contact with the insulating ring and alternately with the electrodes therein.

5. An explosion engine including a crank box and a main shaft, one being rotatable relative to the other, a plurality of cylinders secured to the crank box, a plurality of spark plugs connected with the cylinders respectively, an arm fixedly secured to the crank box, an insulating ring fixedly secured to the arm and carried thereby about the main shaft, electrodes fixed in the ring, a plurality of circuit wires connected with the electrodes and the spark plugs respectively, a pinion fixedly secured to the main shaft, a gear wheel rotatably mounted on the crank box in mesh with the pinion and having an insulating block secured thereto, a conducting ring fixedly supported concentrically to the main shaft, a head secured to the insulating block and provided with a brush that is in movable contact with the conducting ring, and an electrode mounted in the head and carried thereby in contact with the insulating ring and alternately with the electrodes therein.

6. In an explosion engine, the combination of a frame, a main shaft fixedly secured to the frame, a sleeve fixedly secured on the shaft and having a longitudinal groove in the inner side thereof, the sleeve having arms thereon, an exhaust box rotatable on the shaft, a conducting ring insulated from and supported by said arms, the ring extending about the shaft concentrically thereto, an insulated circuit wire connected with said ring and extending in said groove through said sleeve, a crank box rotatably mounted on the main shaft and having circuit closing apparatus thereon, the apparatus including a brush carried about the main shaft in contact with said conducting ring, gearing connecting said apparatus with the main shaft, a plurality of cylinders mounted on the crank box and having outlet openings respectively, a plurality of exhaust pipes connected with the openings of the cylinders respectively and also with the rotatable exhaust box, said pipes being carried about said conducting ring and circuit wires connected with the spark plugs respectively and also with said circuit closing apparatus.

7. In an explosion engine, the combination of a main shaft and a crank box thereon, one being rotatable relative to the other, cylinders fixed to the crank box, pistons in the cylinders operatively connected with the crank shaft, spark plugs connected with the cylinders respectively, circuit wires connected with the plugs respectively, an arm secured to the crank box, a guide ring secured to the arm and having a supporting arm that is rotatively connected to the crank shaft, the said ring having insulated electrodes therein that are connected with the circuit wires respectively, a pinion secured to the crank shaft, a gear wheel rotatably mounted on the crank box in mesh with the pinion, and a circuit closer carried by the gear wheel into successive contact with said electrodes.

8. In an explosion engine, the combination of a supported shaft, a sleeve fixedly secured on the shaft and having arms on one end thereof, an insulating ring secured to said arms, a conducting ring secured to the insulating ring and extending about the shaft concentrically thereto, an annular insulating electrode holder having an arm rotatably connected to said shaft, a crank box rotatably mounted on said shaft and having an arm thereon that is secured to said holder for moving the holder about the shaft, electrodes fixed in said holder, and circuit closing apparatus rotatably supported by the crank box in operative relation to the holder and the electrodes, the apparatus including a brush carried about said shaft in contact with said conducting ring.

9. In an explosion engine, the combination of stationary bearing, a main shaft fixedly secured to the bearing, a sleeve on the shaft fixedly secured thereto and having arms thereon, a conducting ring extending about the shaft and supported by the arms, a circuit wire connected with the ring, a crank box rotatably mounted on the main shaft, cylinders mounted on the crank box, spark plugs connected with the cylinders respectively, individual circuit wires connected with the plugs respectively, and circuit forming apparatus carried by the crank box about the main shaft and having a brush thereon carried in movable contact with said conducting ring, the said apparatus being connected with the individual circuit wires.

10. In an explosion engine, the combination of a main shaft, a crank box rotatably mounted on the shaft and having a stub axle thereon extending parallel to the shaft, a pinion secured to the shaft opposite the axle, a gear wheel rotatably mounted on the axle and carried thereby about the pinion in mesh therewith, the gear wheel having an insulating block thereon, a conducting ring extending about the shaft concentrically thereto and fixedly supported, a guide head fixedly secured to said block and having a socket extending in alinement with said axle, a spring in said socket, a brush in said socket seated on said spring and having sliding contact with said conducting ring, an arm secured to said crank box, an annular insulating electrode holder secured to said arm and extending about said guide head, electrodes fixed in said holder, a circuit connector movable in said guide head and having a roller to run over said electrodes, and a spring between said guide head and said connector.

In testimony whereof, I affix my signature in presence of two witnesses.

WILLIAM W. GERBER.

Witnesses:
 E. T. SILVIUS,
 M. E. SPARROW.